United States Patent [19]
Jenkins

[11] 4,158,868
[45] Jun. 19, 1979

[54] UNIVERSALLY ADJUSTABLE HEAD SUPPORT FOR TAPE DECK

[75] Inventor: John P. Jenkins, Towanda, Ill.

[73] Assignee: International Tapetronics Corporation, Bloomington, Ill.

[21] Appl. No.: 875,866

[22] Filed: Feb. 7, 1978

[51] Int. Cl.² .................................................. G11B 21/24
[52] U.S. Cl. ................................................... 360/109
[58] Field of Search ....................................... 360/109

[56] References Cited
U.S. PATENT DOCUMENTS

| | | | |
|---|---|---|---|
| 3,155,359 | 11/1964 | Hogan et al. | 360/109 |
| 3,310,791 | 3/1967 | Fischer | 360/109 |

*Primary Examiner*—Robert S. Tupper
*Attorney, Agent, or Firm*—McCaleb, Lucas & Brugman

[57] ABSTRACT

A fully manually adjustable embodiment has a base member fastened to and spaced from a tape deck frame. Two identical mounting block members are provided, one for a recording head and one for a reproducing head. A rear portion of each mounting block member is positioned in the space between the base member and the tape deck frame. Three balls, loosely retained in cylindrical bores in the bottom face of the base member, are seated in spherical recesses in the top face of each mounting block member. An adjusting screw, threadedly engaged with the base member, extends into each cylindrical bore, engaging the corresponding ball. Tension springs are connected between pins in the base member and each mounting block member to draw them toward one another and thereby engage the balls between the adjusting screws and the spherical recesses. Two of the balls on each mounting block member are located along a central axis of the head to establish an azimuth axis. The third ball is offset from the azimuth axis and establishes a zenith axis extending at right angles to the azimuth axis midway between the first two balls. The three adjustment screws for the three balls on each mounting block member provide optimum manual adjustment of azimuth and zenith; and they provide ready centering adjustment of the head relative to the tape. Another embodiment, for automatic motorized azimuth adjustment, substitutes a motor-driven universally pivotal connection for the third ball and its associated adjusting screw.

15 Claims, 16 Drawing Figures

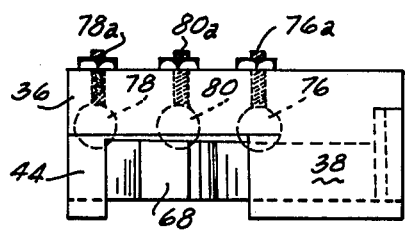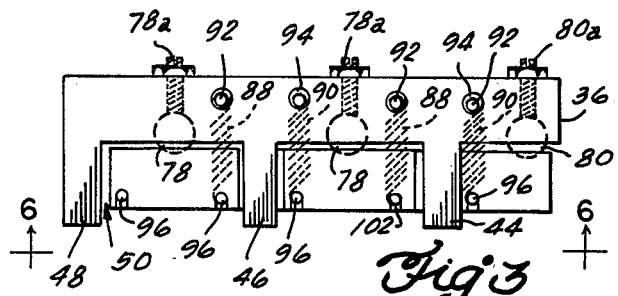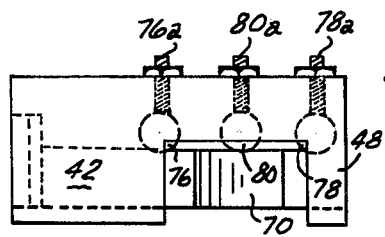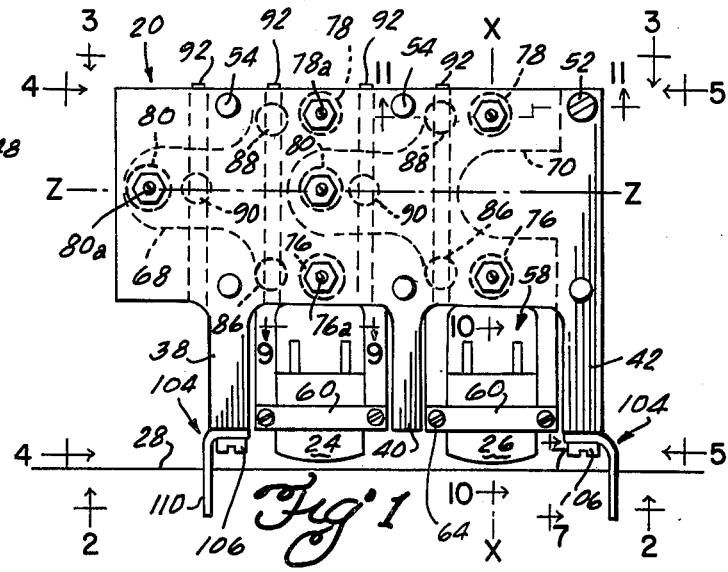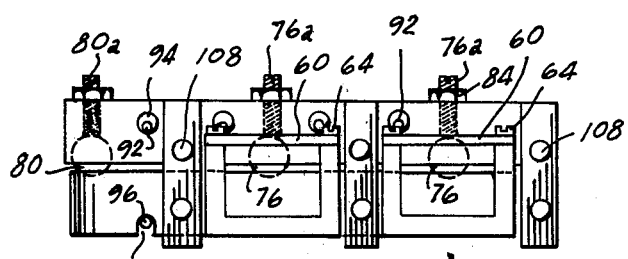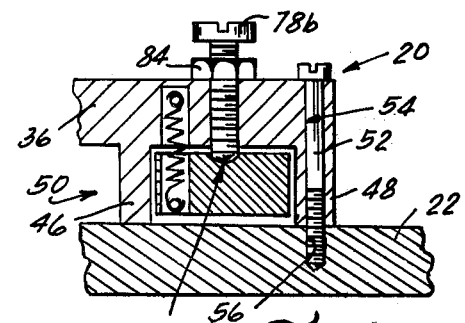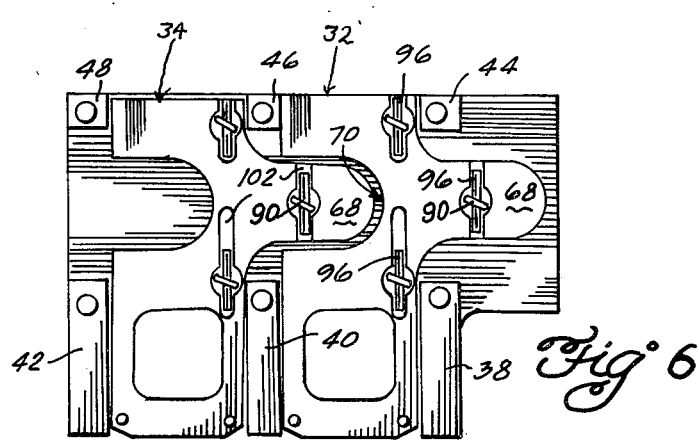

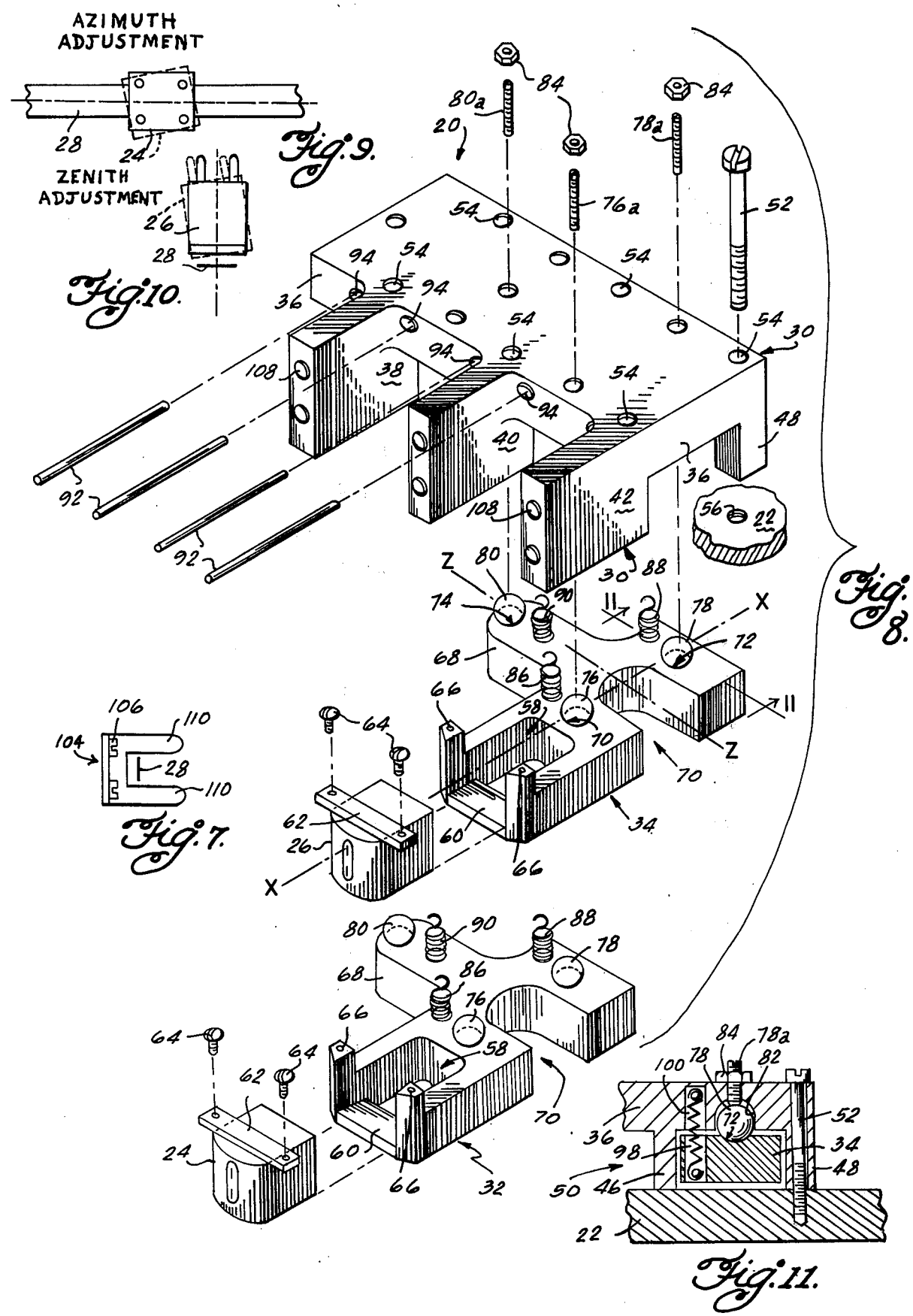

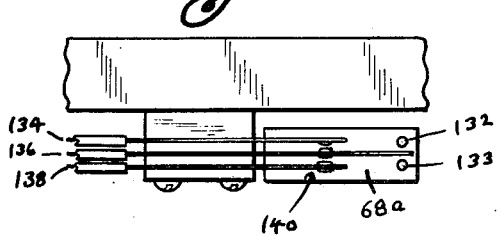
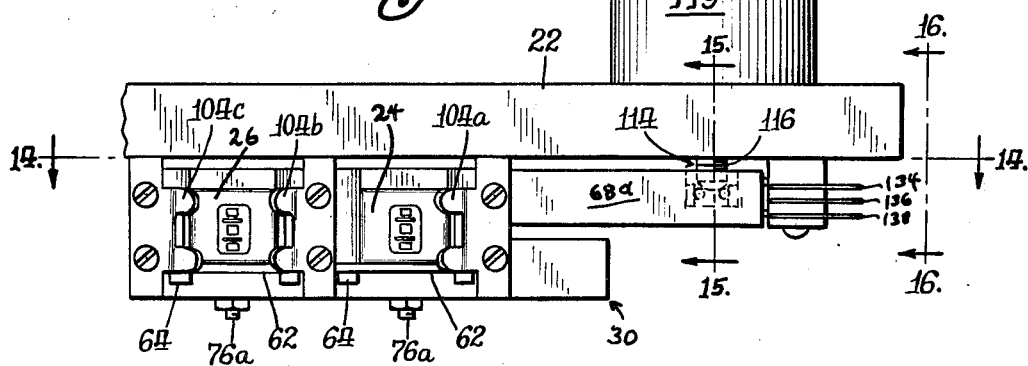
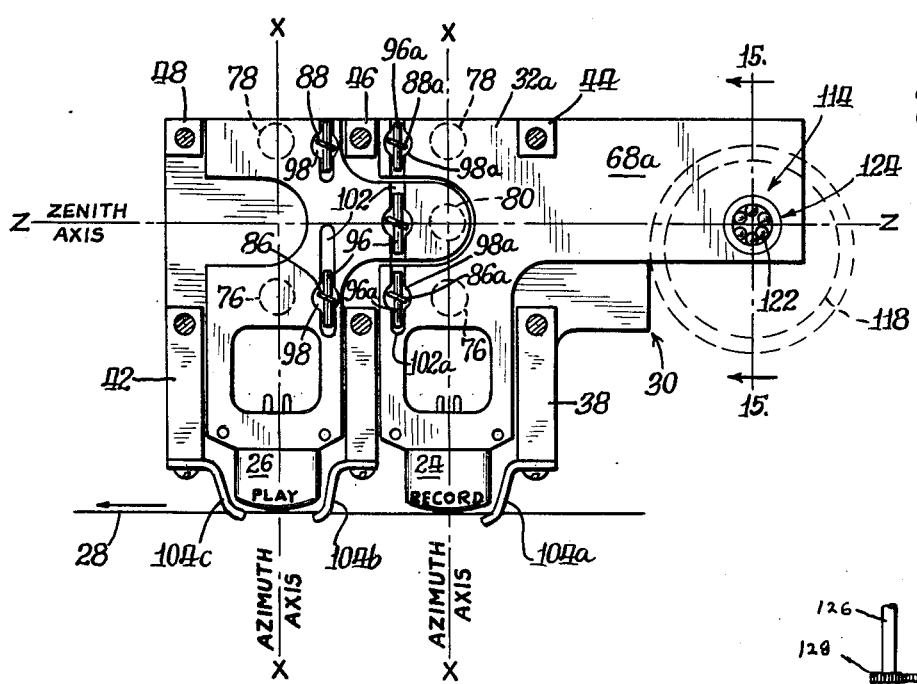
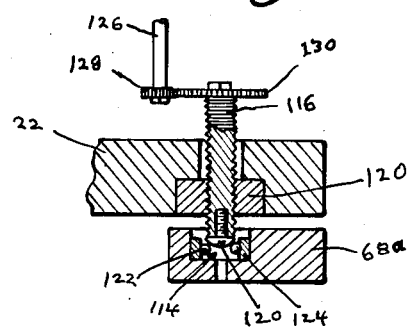

UNIVERSALLY ADJUSTABLE HEAD SUPPORT FOR TAPE DECK

BACKGROUND OF THE INVENTION

The invention relates to an adjustable head support for a tape deck and is an improvement over the support shown in applicant's U.S. Pat. No. 3,833,925 issued Sept. 3, 1974 on "Cassette Tape Transport with Universally Adjustable Head."

To maintain peak recording and reproducing efficiency, a head must be kept precisely oriented with respect to the tape. Except for applicant's above-mentioned earlier patent, conventional head supports have relatively complicated adjustments to maintain optimum zenith, azimuth and centered relations between the head and tape. None has a simple, reliable means for correcting azimuth by rotating the head about an axis closely adjacent to, or along the central axis of, the head.

BRIEF SUMMARY OF THE INVENTION

A general object of this invention is to provide a simplified universal adjustment for a tape deck head, using only three screws to make zenith, azimuth, and centering adjustments.

A specific object is to provide ball-shaped thrust elements, such as rounded-end portions, or separate balls, at the ends of the adjustment screws, seated on an adjustable mounting block member which carries the head, to keep stresses between the seated parts uniform through a wide range of adjusted positions, thereby making all adjustments easier and smoother and capable of holding a predetermined setting for a long time.

Another object is to seat each mounting block member against its three ball-shaped thrust elements by means of springs located to be effective on all three ball-shaped thrust elements.

Another object is to position two of the ball-shaped thrust elements along a central axis intersecting the head face to define an azimuth axis, thereby enabling an azimuth correction to be made by rocking the head about an azimuth axis by means of adjustment screw for the third ball-shaped thrust element.

Another object is to offset the third ball-shaped thrust element from the azimuth axis to define a zenith axis intermediate the other two ball-shaped elements extending at right angles to the azimuth axis, thereby enabling a zenith adjustment to be made by rocking the head by means of the adjustment screws for such other two ball-shaped elements.

Other objects and advantages will be apparent from the following description taken in connection with the drawings in which:

FIG. 1 is a plan view of an adjustable head assembly illustrating a preferred fully manually adjustable form of the present invention;

FIG. 2 is a front view of FIG. 1 with the heads, tape, and tape guides removed to show the structure behind them;

FIG. 3 is a rear view of FIG. 1;

FIGS. 4 and 5 are side views of FIG. 1 as seen from the left and right respectively with the heads, tape and tape guides removed;

FIG. 6 is a bottom view of FIG. 3;

FIG. 7 is a view of one of the tape guides shown in FIG. 1 taken in the direction of arrows 7—7;

FIG. 8 is an exploded perspective view of FIG. 1 without the tape and tape guides;

FIG. 9 is an outline view of the head and tape taken along line 9—9 of FIG. 1 illustrating azimuth adjustment;

FIG. 10 is an outline view of the head and tape taken along line 10—10 of FIG. 1 illustrating zenith adjustment;

FIG. 11 is a fragmentary cross-sectional view of FIGS. 1 and 8 taken approximately on line 11—11;

FIG. 12 is a view similar to FIG. 11 showing a modified manually adjustable form of the invention.

FIG. 13 is a front view of another embodiment illustrating a form of the invention employing a motorized automatic azimuth control.

FIG. 14 is a cross-sectional view of FIG. 13 taken on line 14—14;

FIG. 15 is a fragmentary cross-sectional view of FIGS. 13 and 14 taken along lines 15—15; and FIG. 16 is a fragmentary view of FIG. 13 taken in the direction of arrows 16—16. Like parts are referred to by like reference characters throughout the figures of the drawings.

DETAILED DESCRIPTION OF THE ILLUSTRATED EMBODIMENT

A preferred embodiment of a fully manually adjustable head support shown in FIGS. 1-11 will now be described. It is generally designated 20, it is mounted on a frame 22 by bolts 52, and it supports transducer means here illustrated as recording and reproducing heads 24 and 26. As shown in FIG. 1, a tape 28 is trained for movement along a path past the heads.

The adjustable head support 20 comprises a base member 30 and identical mounting block members 32 and 34 for the heads 24 and 26 respectively.

The base member 30 consists essentially of a base plate 36 which is mounted in spaced parallel relation to the frame 22 by sidewalls 38, 40 and 42, and by legs 44, 46, and 48. These sidewalls and legs extend downwardly and are seated on the top surface of the frame 22 so as to separate the base plate 36 and the frame by a space 50, as shown in FIG. 11. Bolts 52 extend through holes 54 in the base member and are threaded into tapped holes 56 in the frame.

Each mounting block member 32 or 34 has a cavity 58 within which the recording or reproducing head 24 or 26 is seated on a cross bar 60 and held in place by a strap 62 fastened as by screws 64 into threaded holes 66. Each mounting block member has a transversely offset tongue portion 68 and a similarly-shaped recess 70 in the opposite edge where, as illustrated here, two or more mounting block members are employed. The tongue portion of one mounting block member fits within the recess of an adjacent member as best shown in FIG. 6. The upper face of each mounting block member has three spherical recesses 70, 72, and 74. Balls 76, 78 and 80 respectively are seated in those recesses. Each ball is loosely guided in a cylindrical bore 82 formed in the underside of the base plate 36, one of these being clearly shown in cross-section in FIG. 11.

Adjustment screw means comprises three spaced, parallel adjustment screws 76a, 78a, 80a, threaded into the top of base member plate 36, aligned with and engaging the balls 76, 78, and 80 respectively. There is a lock-nut 84 for each screw.

The mounting block members 32 and 34 and the ball elements described are held assembled in the space 50 beneath the base member plate 36 by means of tension springs 86, 88 and 90. As shown in FIG. 11, these springs are positioned within aligned bores 98 and 100 in the mounting block members 32, 34 and in the base plate 36 respectively. Parallel bores 94 extend through the upper portion of the base plate 36 and intersect bores 100. Anchor pins 92 (FIGS. 2 and 8) extend through the bores 94 and are engaged by the upper ends of the springs. The lower ends of the springs are engaged by short pins 96 (FIG. 6) seated in grooves 102 in the bottom surfaces of the mounting block members.

Tape guide brackets 104, (FIG. 1) are mounted on the ends of sidewalls 38 and 42. Each is fastened by a pair of screws 106 engaging threaded bores 108 (FIGS. 2 and 8). As shown in FIG. 7, each bracket is formed with a pair of tape guide fingers 110.

As above described, there is an azimuth axis X—X extending along the pair of balls 76 and 78 and intersecting the face of the corresponding head 24 and 26. Although it is not necessary that the azimuth axis extend precisely along a line intersecting the center of the face and the centers of the balls 76 and 78, the invention does land itself to such precise alignment if desired. Whatever exact disposition is chosen for the azimuth axis, it will in any case be substantially perpendicular to the plane of the tape 28.

As best shown in the plan view of FIG. 1, each of the balls 80 is located on a line Z—Z which is parallel to the tape and is substantially midway between the pairs of balls 76 and 78. This line represents the zenith axis for both of the heads.

Azimuth adjustment will now be described. Azimuth (or skew) is the angular relation between the longitudual center lines of the head and the tape, as seen along a line normal to the plane of the tape. As shown in FIG. 9, for the head and tape shown in solid lines, these centerlines should be parallel. To adjust the azimuth for either head, only a single adjustment screw 80a for that particular head need be turned, either inward or outward, depending on the direction of adjustment required. This will cause the mounting block member to rock or pivot about the appropriate azimuth axis X—X above described, extending through the corresponding balls 76 and 78.

Zenith adjustment will now be described. Zenith (parallelism) is the angular relationship between the head face and the tape, as seen in a plane which is perpendicular to the longitudinal center line of the tape. These should be parallel, as shown in solid lines in FIG. 10. To adjust zenith, one of the adjusting screws 76a and 78a will be tightened while the other is correspondingly loosened, causing the entire mounting block member and the head supported by it to pivot about the zenith axis Z—Z, above described, which extends parallel to the tape through the ball 80.

Thus it will be seen that both azimuth and zenith adjustments may be made quite precisely because pivotal adjustment is carried out in either case about an axis extending through ball-shaped thrust means.

By simultaneously adjusting screws 76a, 78a, and 80a, the head may be centered with respect to the tape.

An alternate form of the fully manually adjustable head support is shown in FIG. 12 where a ball-shaped surface 112 is provided on the end of an adjustment screw 78b instead of a separate ball as described in connection with FIGS. 1–11. The embodiment of FIG. 12 is substantially identical to that shown in the previous figures except that all or some of the balls 76, 78 and 80 may be substituted by the ball end surface 78a on one or more of the adjustment screws.

A further alternate form of the invention is shown in FIGS. 13–16, for use with automatic azimuth adjustment apparatus shown and described in applicant's copending U.S. application Ser. No. 851,499 filed Nov. 14, 1977 on "AUTOMATIC AZIMUTH CONTROL FOR MAGNETIC TAPE RECORDING AND REPRODUCING APPARATUS."

For comparison, FIG. 14 is substantially identical to FIG. 6 except that special mounting block member 32a is substituted for mounting block member 32. In addition, heads 24 and 26, and tape guide brackets 104a, 104b, and 104c are shown to illustrate a complete assembly.

Mounting block member 32a is identical to mounting block member 32 except that a pair of spring bores 98a are provided just to the left of balls 76 and 78, instead of the three bores 98, and there is a special tongue 68a, longer than tongue 68.

In FIGS. 13 and 14, head 24 is for recording and head 26 is for reproducing. As shown in FIG. 14, movement of tape 28 is to the left. Only two balls 76 and 78 are interposed between base member 30 and mounting block member 32a. These are seated between adjusting screws and spherical recesses (not shown) exactly as described in connection with the FIG. 1–11 embodiment.

Also, as best shown in FIG. 14, only two springs 86a and 88a are used between the base member 30 and mounting block member 32a. These springs are exact counterparts of springs 86 and 88 already described, being retained in bores 98a and hooked onto short pins 96a seated in grooves 102a. Tension springs 86a and 88a draw the members 30 and 32a toward one another against opposite sides of balls 76 and 78.

A universal joint threaded connection generally designated 114 is provided between mounting block member tongue 68a on the one hand, and a reversible azimuth adjust motor 118 and reduction gear box 119 on the other hand. Screw shaft 116 has a spherical head at its lower end. In the present case, as best seen in FIG. 15, this is provided by a spherical-headed cap screw 120 threaded into the end of screw shaft 116. The spherical head of the screw engages balls 122 of a ball thrust bearing 124 which is press-fitted into a bore in the tongue 68a. Inasmuch as balls 76 and 78, and ball-headed cap screw 120, respectively apply force reactions to member 32a in opposite directions, on opposite sides of the azimuth axis X—X, the single pair of springs 76 and 78 effectively hold member 32a seated in stable, adjusted position as determined of the screw 116 and the screws 76a and 78a associated with the two balls 76 and 78.

Within gear box 119, there is step-down gearing enabling the screw shaft 116 to be rotated by reversible motor 118 at a a lower speed than motor shaft 126. The step-down gearing is illustrated in simplified form as a pinion 128 on shaft 126, driving a larger diameter gear 130 fastened to the screw shaft 116.

Rotation of motor shaft 126 in one direction or the other rocks the mounting block member 32a one way or the other about its azimuth axis X—X. Although not forming any part of the present invention, a pair of vertically spaced pins 132, 133 extend from the right hand end of the mounting block member extension 68a. These flank an actuator leaf of a switch 140 which connects conductors 134 and 136 when the extension 68a is in an up position, and connects conductors 136, 138 when it is in a down position. For a detailed description of the operation of an automatic azimuth control apparatus, see applicant's above-mentioned co-pending application Ser. No. 851,499.

Adjustment of the screws 76a and 78a associated with the balls 76 and 78 will tilt the mounting block member 32a about zenith axis Z—Z, this being enabled by the universal joint 114.

While three forms in which the present invention may be embodied have been shown and described, it will be understood that various modifications may be made within the spirit and scope of the invention which should be limited only by the appended claims; for instance, while two mounting block member, with a single head, may be used; or more than two, with corresponding members of heads, may be used.

The embodiments of the invention in which an exclusive property or privilege is claimed are defined as follows:

1. In a tape transport mechanism, a frame having a tape trained for movement along a path past transducer means consisting of at least one head, means enabling universal adjustment movement of said head relative to the tape comprising:
    a mounting block member and means supporting said head thereon with the centerline of the head normal to the plane of the tape;
    a base member on said frame;
    means connecting said mounting block member to said base member comprising spring means, and first and second adjusting screw means;
    said spring means being connected to urge said members toward one another;
    said screw means including three spaced, parallel screws each threadedly engaging one of said members and having ball-shaped thrust means seated by said spring means against the other of said members;
    said first screw means consisting of a pair of said screws having axes intersecting the centerline of the head, the pair of said ball-shaped thrust means of said pair of screws being located along the centerline of the head to thereby establish an azimuth axis along said pair of ball-shaped thrust means;
    said second screw means consisting of the third of said three screws, the axis of which is offset from said azimuth axis, said axis of said third screw intersecting a line which is perpendicular to said azimuth axis to thereby establish a zenith axis at right angles to the azimuth axis;
    whereby the zenith of said head relative to the tape is changed by adjusting either or both of said pair of screws to tilt said mounting block member about said zenith axis;
    whereby further the azimuth of said head relative to the tape is changed by adjusting said third screw to tilt said mounting block about said azimuth axis; and
    whereby still further the transverse position of the head relative to the tape is changed by adjusting all three screw members.

2. In a tape transport mechanism, the combination of claim 1 in which the ball-shaped thrust means of said three screws are in a plane normal to the tape and parallel to the direction of movement of the tape.

3. In a tape transport mechanism, the combination of claim 1 in which said base member is fixed to said frame and has a plate portion separated therefrom by a space;
    the mounting block member has a rear portion located in said space;
    the head is carried on a front portion of said mounting block member outside of said space; and
    said spring means and said ball-shaped thrust means act between said plate portion of the base member and said rear portion of the mounting block member, within said space.

4. In a tape transport mechanism, the combination of claim 1 in which said azimuth axis intersects the face of said head.

5. In a tape transport mechanism, the combination of claim 1 in which said spring means is offset from said azimuth axis and effective within a triangular space defined by the axes of said three screws.

6. In a tape transport mechanism, the combination of claim 1 in which said other member has spherical recesses receiving said ball-shaped thrust means.

7. In a tape transport mechanism, the combination of claim 1 in which said ball-shaped thrust means are separate balls at the ends of said screws.

8. In a tape transport mechanism, the combination of claim 7 in which said balls are guided in cylindrical bores in said one of said members.

9. In a tape transport mechanism, the combination of claim 1 in which said spring means comprises at least one tension spring having opposite ends connected to said mounting block member and to said base member respectively.

10. In a tape transport mechanism, a frame having a tape trained for movement along a path past transducer means consisting of at least one head, means enabling universal adjustment movement of said head relative to the tape comprising:
    a base plate fixed to said frame in spaced parallel relation thereto, said base plate having at least a pair of sidewalls normal to the plane of the tape and spaced apart along the path of movement of the tape to define a recess within which said head is disposed, a pair of tape guide fingers fixed to the end of each said sidewall engageable with the edges of said tape;
    a mounting block having a front portion extending into said recess and having means for supporting said head, and a rear portion beneath said base plate extending into the space between the underside of the base plate and the top side of the frame;
    adjustment means connecting said mounting block to said base plate comprising three balls; three adjustment screws, and spring means,
    two of said balls being spaced apart along an azimuth axis normal to the path of tape movement and intersecting the front face of said head;
    the third of said balls being offset from said azimuth axis along a zenith axis parallel to said path of movement of the tape, said zenith axis being intermediate said two balls;
    said three balls being seated respectively in three recesses in said rear portion of said mounting block and being axially movable respectively within cylindrical bores in said base plate;
    said three adjustment screws being threadedly engaged at their bottom ends with said three balls respectively within said bores, and having their top ends extending from the top surface of said base plate for adjustment accessibility; and said spring means urges the mounting block upwardly to press the balls into the respective recesses in the mounting block and against the respective adjustment screws;

whereby the azimuth of said head relative to the tape is changed by adjusting the screw for said third ball to pivot the mounting block about said azimuth axis;

whereby further the zenith of said head relative to the tape is changed by adjusting either or both of the screws for the first and second balls; and whereby still further the head is centered with respect to tape trained between said fixed guide fingers by adjusting all three screws.

11. In a tape transport mechanism, a frame having a tape trained for movement along a path past transducer means consisting of at least one head, means enabling universal adjustment movement of said head relative to the tape comprising:

a mounting block member and means supporting said head thereon with the centerline of the head normal to the plane of the tape;

means connecting said mounting block member to a base member on said frame comprising spring means, and first and second adjusting means;

said spring means being connected between said members to urge them toward one another;

said first adjusting means comprising a pair of screws and a pair of ball-shaped thrust means at the ends of said screws, each screw having one end portion threadedly engaging one of said members and having one of said ball-shaped thrust means at the opposite end portion seated against the other of said members to hold said members in a selected spaced relationship against the urgence of said spring means, said pair of ball-shaped thrust means being spaced apart in the direction of the centerline of the head to establish an azimuth adjustment axis for said head;

said second adjusting means comprising a movable element having a third ball-shaped thrust means at the end thereof, said movable element having one portion threadedly engaging one of said members and said third ball-shaped thrust means at the opposite end portion thereof seated against the other of said members at a position offset from said centerline to establish a zenith adjustment axis extending perpendicular to said azimuth axis between said pair of ball-shaped thrust means;

whereby the zenith of said head relative to the tape is changed by adjusting said first adjusting means; and whereby further the azimuth of said head relative to the tape is changed by adjusting said second adjusting means.

12. In a tape transport mechanism, the combination of claim 11 in which said movable element is connected to said mounting block member by universal joint means.

13. In a tape transport mechanism, the combination of claim 11 in which said movable element is power-driven by motor means.

14. In a tape transport mechanism, the combination of claim 11 is which said spring means and said movable element are disposed on opposite sides of said azimuth adjustment axis.

15. In a tape transport mechanism, the combination of claim 11 in which the three ball-shaped thrust means are individual balls.

* * * * *